Feb. 5, 1935.  L. S. HAMER  1,989,980
CONNECTION FOR FLUID CONDUITS
Filed Jan. 25, 1930  2 Sheets-Sheet 1
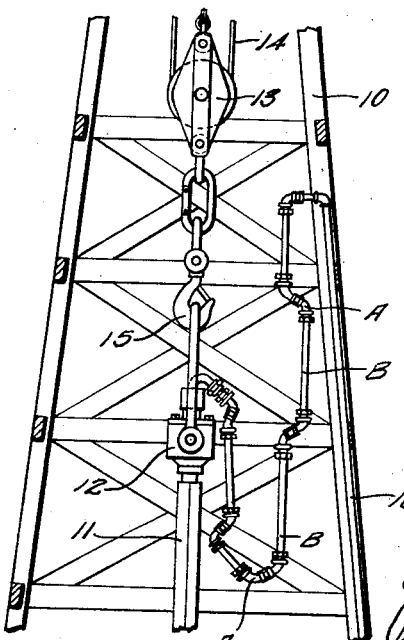
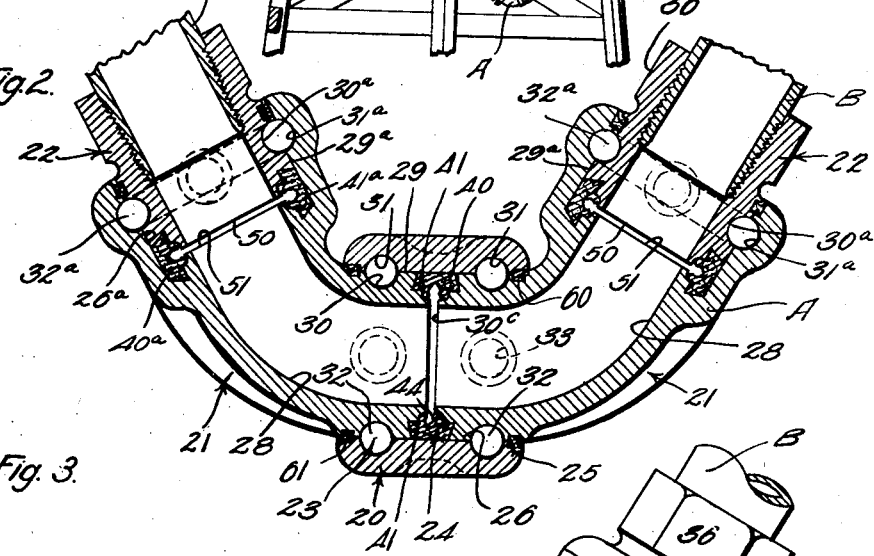
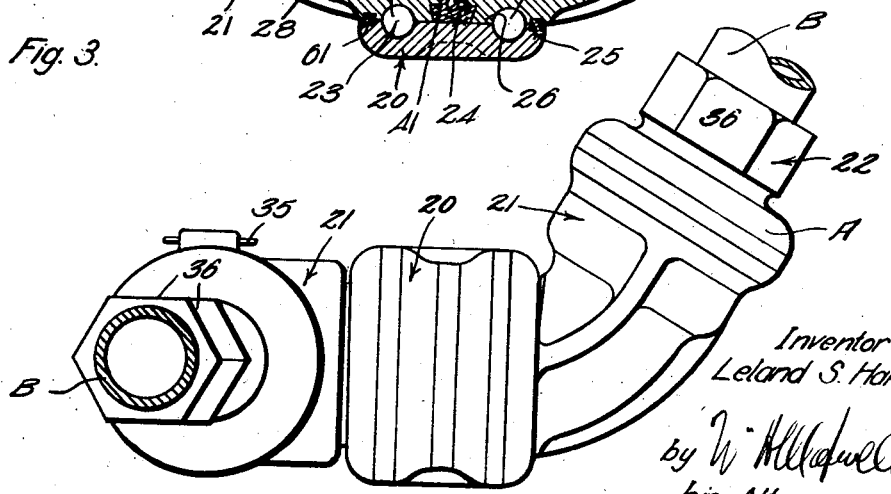
Inventor
Leland S. Hamer
by his Attorney Feb. 5, 1935.  L. S. HAMER  1,989,980
CONNECTION FOR FLUID CONDUITS
Filed Jan. 25, 1930  2 Sheets-Sheet 2
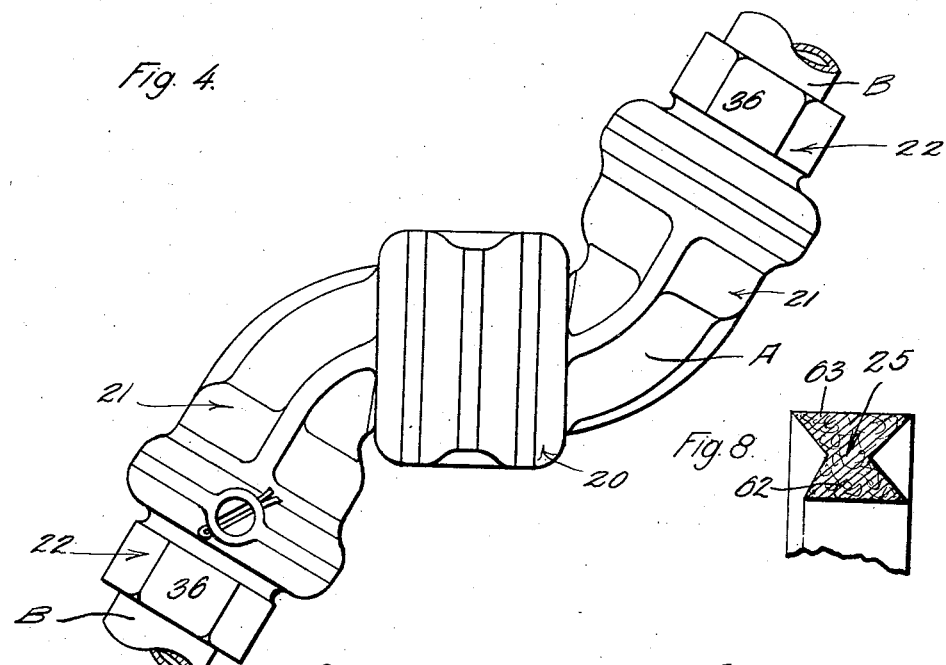
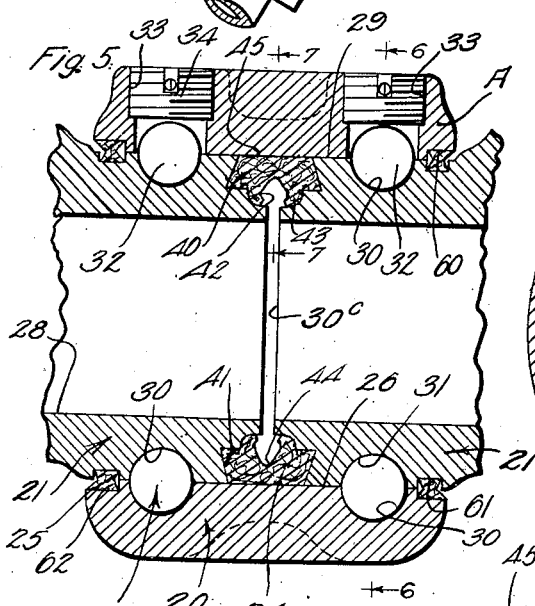
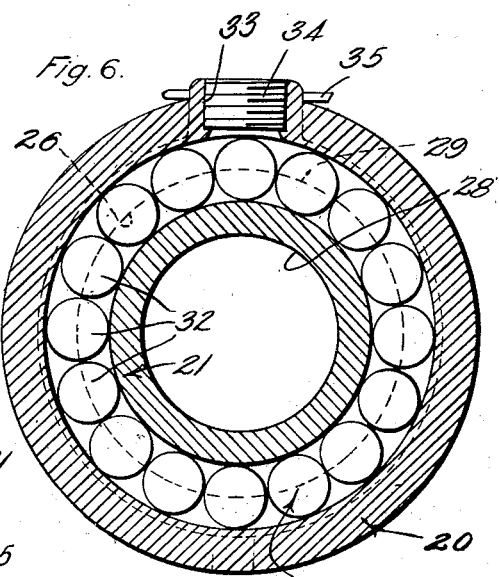
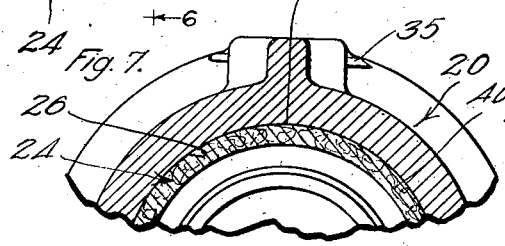
Inventor
Leland S. Hamer
by
his Attorney Patented Feb. 5, 1935

1,989,980

UNITED STATES PATENT OFFICE 1,989,980

CONNECTION FOR FLUID CONDUITS

Leland S. Hamer, Long Beach, Calif.

Application January 25, 1930, Serial No. 423,447

10 Claims. (Cl. 285—96)

This invention has to do with a connection for use in a fluid conduit, and it is an object of the invention to provide a connection which has a substantial amount of flexibility and is simple and dependable in construction and operation.

The device provided by this invention is useful, generally, where it is desired to provide a flexible or universally movable fluid connection. The device is particularly practical for handling high pressures and for use under severe working conditions. For example, the device can be used to great advantage in the conduit connected to the swivel of a rotary well drilling rig. The swivel of a rotary well drilling rig is mounted at the upper end of the drilling string and is supplied with fluid, usually mud laden fluid, under high pressures. As the drilling operations are carried on the swivel is raised and lowered in the derrick, making it necessary for the fluid conduit connected to the swivel to be flexible. In view of the fact that this particular application or use will serve well to illustrate the use and utility of the invention, I will proceed with a detailed description of a form of the invention particularly designed for this use, it being understood, however, that the invention broadly is not limited to this or any other specific application or use.

It is a general object of the invention to provide a joint or connection that is freely flexible to move in various directions and at the same time simple and inexpensive of construction and effective in handling fluids at high pressures.

A further object of the invention is to provide an improved arrangement or construction for connecting parts of a flexible metallic connection so that they are securely and dependably held together and are free to revolve relative to each other.

It is a further object of this invention to provide a novel effective means for packing or sealing between the relatively moving parts of a connection of the character mentioned.

A further object of the present invention is to provide a connection of the character mentioned including sealing means which operates to exclude the foreign matter from the finished or fitting parts so that said parts are maintained under ideal working conditions.

Another object of this invention is to provide a construction for connecting or securing together the relatively moving parts of a connection of the character mentioned which allows the parts to move or revolve relative to each other with a minimum of resistance or friction.

It is another object of this invention to provide a construction of the character mentioned involving a minimum number of simple inexpensive parts making the construction inexpensive of manufacture and of great commercial value.

The various objects and features of my invention will be best and more fully understood from the following detailed description of a typical form and application of the invention, throughout which description reference is had to the accompanying drawings, in which:

Fig. 1 is a fragmentary view of the derrick of a well drilling rig employing the rotary method of drilling, being a view showing a drilling string located in the derrick and a fluid conduit connected with the swivel on the drilling string, the conduit embodying connections provided by this invention. Fig. 2 is an enlarged longitudinal detailed sectional view of a connection embodying the invention showing the parts positioned to approximate a return bend. Fig. 3 is an enlarged elevation of a connection embodying the invention showing the connection in a position different from that illustrated in Fig. 2. Fig. 4 is a view similar to Fig. 3 showing the connection in still another position, the position shown in Fig. 4 being one in which the fluid is discharged from the connection in the same direction that it enters. Fig. 5 is an enlarged longitudinal detailed sectional view taken at the middle of the connection. Fig. 6 is a transverse sectional view taken as indicated by line 6—6 on Fig. 5. Fig. 7 is a transverse sectional view taken as indicated by line 7—7 on Fig. 5, and Fig. 8 is an enlarged transverse sectional view of one of the packing rings employed in the construction.

The portion of the derrick illustrated in the drawings for the purpose of showing an application of the present invention includes the derrick proper 10, a drill stem or kelly 11 standing in the derrick, a swivel 12 attached to the upper end of the drill stem, a traveling block 13 suspended in the derrick by a cable 14, a hook 15 attached to the traveling block and carrying the bales of the swivel, and various other parts common to equipment of this character. A fluid supply pipe 16 extends upwardly at one side of the derrick to a suitable point intermediate the ends of the derrick and a flexible conduit connects the pipe 16 with the swivel 12. It has been common practice to connect the pipe 16 and swivel 12 by means of a heavy hose and in some instances the connection has been made by means of short lengths of pipe joined by swivel connections. The present invention provides a universally movable or swivel connection suitable for use in the last-mentioned type of device or in other situations where a universally movable fluid connection is desired. In the drawings I have shown a plurality of swivel connections A embodying the present invention connecting lengths of pipe B to form a flexible conduit which connects the supply pipe 16 with the swivel 12. The various connections A may be alike in construction and formation, and therefore I will confine the detailed description to a single connection embodying the invention, it being understood that the details given may apply to each of the connections embodied in the flexible conduits.

The connection provided by this invention includes, generally, a central section 20, two end sections 21, couplings 22 carried by the end sections 21, connecting means 23 holding the end sections in connection with the center section 20 and holding the couplings 23 in connection with the end sections 21, packing means 24 sealing the connected parts against the escape of fluid handled by the connection, and packing means 25 sealing the connected parts against the entrance of fluid or foreign matter between relatively moving parts of the connection.

The central section 20 of the connection is preferably a straight tubular part just sufficiently long to properly connect two end sections 21. The central section 20 has a central longitudinal opening or bore 26 extending through it from one end to the other, the bore being finished to rotatably carry the inner ends of the end sections.

The end sections 21 are connected to and are joined by the center section 20 and in accordance with the present invention are swivelly connected with the center section so that they are free to swivel or turn independently of each other. The end sections 21 are tubular members longitudinally bent or curved in a manner such as is illustrated throughout the drawings. The degree or extent to which the end sections are curved may vary, depending upon the situation in which the connection is to be used, it being preferred in most cases to make the bend anywhere from about 60 degrees to 90 degrees. In the detailed illustration given in the drawings the bend in each end section is about 60 degrees. In accordance with the invention the opening or passage 28 through each end section is round in cross section and about the size if not equal to the interior of the pipe in which the connection is arranged.

In the preferred construction illustrated in the drawings the inner end of each end section 21 has a finished part 29 which is machined or finished to fit the bore 26 of the center section to allow free rotation of the end sections relative to the center section. The inner or adjoining ends 30ᶜ of the parts 29 do not abut but are spaced somewhat apart to allow fluid pressure to enter the packing means 24 arranged between the end sections and the center sections that will be hereinafter described. The connecting means 23 provided by the invention for connecting each end 21 with the center section 20 so that the end sections are held in place relative to the center section and are independently rotatable relative to the center section. In accordance with the construction provided by this invention, the end part 29 of each end section 21 and the portion of the bore 26 of the center section 20 which receives the said end part 29 have registering grooves 30 and 31, respectively, extending around them forming a channel which is round in cross section. A plurality of spherical members or balls 32 are arranged in this channel and thus operate to key or lock the end part 29 in position in the center section 20. The balls may be introduced into the opening between the sections through a passage 33 extending outwardly through the center section from the groove 31 as illustrated in Figs. 5 and 6 of the drawings.

When the balls have been arranged in place the opening or passage 33 may be closed by a plug 34 which may be locked as by means of a key 35. It is to be understood, of course, that a sufficient number of balls are arranged in the channel or space between the sections to fill it, as shown in Fig. 6, so that the sections are connected or held together uniformly and in a positive and secure manner. The row or series of balls between the sections positively holds the sections together and at the same time makes a connection which allows the sections to freely rotate relative to each other even though there may be a substantial longitudinal pressure tending to move the sections apart.

The couplings 22 are carried by the outer ends of the end sections 21 and serve to swivelly connect lengths of pipe B, or the like, with the end sections 21. In the preferred form of the invention the couplings are tubular parts and each coupling has a finished inner end part 29ᵃ which fits a bore 26ᵃ provided in the outer end portion of the end section 21. The finished part 29ᵃ corresponds to the part 29 at the inner end of the end section 21 while the bore 26ᵃ corresponds to the bore in the center section 20. The outer portion of the coupling is adapted to make connection with a pipe B, or the like, and in the case illustrated is internally threaded for this purpose. The exterior of the outer portion of the coupling is adapted to receive a wrench, or the like, and in the case shown is provided with a plurality of flat sides 36.

The connecting means 23 provided by the present invention is employed to connect each coupling 22 with the outer end portion of the end section to which it is applied. It will be apparent from the drawings how the part 29ᵃ and bore 26ᵃ are provided with registering grooves 30ᵃ and 31ᵃ forming a space carrying a series of balls 32ᵃ. It will be obvious that the connecting means employed at this point in the construction may be identical with that hereinabove described as connecting the end sections with the middle section.

The packing means 24 which operates to seal against the escape of fluid being handled by the connection is in units which are substantially the same in construction and operation. A unit of the packing means 24 packs between the parts 29 of the end sections and the middle section. The corners between the ends 30ᶜ and the exteriors of the parts 29 are cut away or recessed so that the end parts 29 when together in the bore 26 form an opening or channel to carry a ring 40 of packing, say, rubber. The recesses in the end parts are formed so that the ends 41 of the channel which receives the packing ring 40 are beveled or inclined so that the inner or smallest diameter of the channel is wider than the outer or peripheral portion of the channel. Further, the recesses are formed with parts 42 which receive radially inwardly extending flanges 43 of the packing ring. A channel 44 is provided in the packing ring between the flanges 43 and communicates with the space between the ends 30ᶜ of the end parts 29 so that fluid pressure handled by the connection enters between the flanges 43 and the packing ring in a manner to hold the flanges 43 tight against the parts 42 of the recesses and so that the packing ring expands in opposite directions against the inclined ends 41 of the recesses. The pressure thus applied to the packing ring also urges it outwardly so that its outer face 45 is held outwardly against or in sealing engagement with the bore 26 of the center section 20. It will be apparent from the drawings, particularly from a consideration of Fig. 5 of the drawings, how the single packing ring 40, being thus formed and related to the parts just mentioned, operates to effectively seal the end sections 21 and the center section so that there is no escape or leakage of fluid between these parts of the device.

A unit of the packing means 24 is provided between each coupling 22 and the outer end portion of the end section 21 to which the coupling connects. In accordance with the invention a recess is provided in the part 29ª at the corner between the end 50 of said part and the periphery of said part and a recess is provided in the shoulder 51 formed between the passage 28 and the bore 26ª to form a channel shaped to carry a packing ring 40ª corresponding in shape to the packing ring 40 hereinabove described. The recesses in the coupling and end section are shaped so that the ends 41ª of the channel are inclined or beveled corresponding to the ends 41 of the channel above described, likewise the recesses are formed with parts to receive inward radial flanges of the packing ring in the manner above described. When the parts are together as shown throughout the drawings the inner end 50 of the coupling is spaced from the shoulder 51 so that the pressure handled by the device enters behind the packing ring between the flanges of the packing ring to expand the packing ring outwardly into sealing engagement with the bore 26ª and in opposite directions against the ends 41ª so that an effective dependable seal is made between the coupling and the end section 21.

The packing means 25 provided to seal against fluid or foreign matter entering between the working or relatively moving parts of the construction includes units at the ends of the center section 20 and at the outer ends of the end sections 21. A recess 60 is provided at each end of the bore 26 of the center section and a recess 61 is provided in the end section opposite the recess 60 so that a channel is formed suitable for carrying a packing ring 62. The packing ring may be of rubber, or the like, and is preferably formed so that its ends have V-shaped channels or grooves forming lips 63 to bear against the bottoms of the grooves 60 and 61. When pressure comes upon the packing ring tending to enter between the parts sealed by the ring, the lips are urged or pressed into sealing engagement with the bottoms of the recesses.

A construction corresponding to that just described is provided between the outer end of each end section 21 and the coupling which extends into it. This will be readily understood from inspection of the drawings.

From the foregoing description and from a consideration of Figs. 2, 3 and 4 of the drawings it will be obvious that I have provided a flexible connection which allows for a wide range of movement between the pipes B which it connects and at the same time is particularly effective and dependable in holding pressure. It is also to be particularly noted that the construction provided by this invention is extremely simple and connects the relatively moving parts so that they are freely movable relative to each other.

Having described only a typical preferred form of my invention, I do not wish to limit myself to the specific details set forth but wish to reserve to myself any changes or variations that may appear to those skilled in the art or fall within the scope of the following claims.

Having described my invention, I claim:

1. A connection for a fluid conduit including, a center section, end sections having portions extending into the center section, packing means between the adjacent inner ends of said portions and engaging the interior of the center section, packing means between the sections at points spaced at opposite sides of the first-mentioned packing means for preventing leakage inwardly between the sections, and means between the first and second-mentioned packing means for holding the said portions in the center section for rotation relative to the center section.

2. A connection for a fluid conduit including, a center section, end sections having portions extending into the center section, a packing ring sealing against the adjacent inner ends of the said portions and the interior of the center section for preventing the leakage of fluid outwardly between the sections, packing means between the sections at each side of the ring for preventing the leakage inwardly between the sections, and means between the packing ring and each packing means for holding the said portions in the center section for rotation relative to the center section.

3. A connection for a fluid conduit including, a center section, end sections having portions extending into the center section, a packing ring sealing against the adjacent inner ends of the said portions and the interior of the center section for preventing the leakage of fluid outwardly between the sections, packing means between the sections at each side of the ring for preventing leakage inwardly between the sections, and means between the packing ring and each packing means for holding the said portions in the center section for rotation relative to the center section, including pluralities of balls in race channels in the said portions and the interior of the center section.

4. A connection for a fluid conduit including, a comparatively short straight tubular center section, longitudinally curved tubular end sections having portions extending into the center section, a packing ring sealing against the adjacent inner ends of the said portions and the interior of the center section for preventing the leakage of fluid outwardly between the sections, packing means between the sections at each side of the ring for preventing leakage inwardly between the sections, and means between the packing ring and each packing means for holding the said portions in the center section for rotation relative to the center section.

5. A connection including a tubular center section, a tubular end section extending into each end of the center section, the inner ends of the end sections having reduced portions providing inwardly facing shoulders, a packing ring on said reduced portions for sealing with the shoulders of the end sections and the interior of the center section, and anti-friction means rotatably connecting each end section with the center section and holding the end sections against relative longitudinal movement so that the packing ring is in effective sealing engagement with the ends of the end sections.

6. A connection including a tubular center section, a tubular end section extending into each end of the center section, there being reduced portions on the inner ends of the end sections providing inwardly facing shoulders on the sections, a packing ring for sealing with the said shoulders of the end sections and with the interior of the center section, the ends of said reduced portions being spaced so that the fluid pressure in the connection may act on the packing, and anti-friction means rotatably connecting each end section with the center section and holding the end sections against relative longitudinal movement so that the packing ring is in effective sealing engagement with the shoulders of the end sections, said means including a series of balls in registering channels in the end sections and center section.

7. A connection including a tubular center section, a tubular end section extending into each end of the center section, there being reduced portions on the inner ends of the end sections providing inwardly facing shoulders on the sections, a packing ring adapted to seal with the interior of the center section and the shoulders of the end sections, and anti-friction swivel connections between the end sections and the center section holding the sections against relative longitudinal movement whereby the packing ring is in effective engagement with the shoulders of the end section.

8. A connection including a tubular center section, a longitudinally curved tubular substantially cylindrical end section extending into each end of the center section, means rotatably connecting each end section with the center section, a single sealing means sealing with the three sections to prevent leakage outwardly between the sections, two lengths of tubing, and a swivel connection between each end section and a length of tubing.

9. A connection for a fluid conduit including, a tubular center section, two tubular end sections both rotatably connected with the center section, a single packing means making a fluid tight connection between the end sections and the center section, and lengths of tubing swivelly connected with the end sections.

10. A connection for a fluid conduit including, a tubular center section, two tubular end sections both rotatably connected with the center section, a single packing ring having sealing engagement with both end sections and the center section, and lengths of tubing swivelly connected with the end sections.

LELAND S. HAMER.